March 15, 1960 J. M. WIER 2,929,030

TRANSISTOR MULTIVIBRATOR FREQUENCY CONTROL

Filed Dec. 6, 1957 2 Sheets-Sheet 1

INVENTOR
J. M. WIER
BY Charles Scott Phelan
ATTORNEY

March 15, 1960 J. M. WIER 2,929,030

TRANSISTOR MULTIVIBRATOR FREQUENCY CONTROL

Filed Dec. 6, 1957 2 Sheets-Sheet 2

INVENTOR
J. M. WIER
BY Charles Scott Phelan
ATTORNEY

United States Patent Office 2,929,030

Patented Mar. 15, 1960

2,929,030

TRANSISTOR MULTIVIBRATOR FREQUENCY CONTROL

Joseph M. Wier, Scotch Plains, N.J., assignor to Bell Telephone Laboratories, Incorporated, New York, N.Y., a corporation of New York Application December 6, 1957, Serial No. 701,222

10 Claims. (Cl. 331—113)

Figure 1:
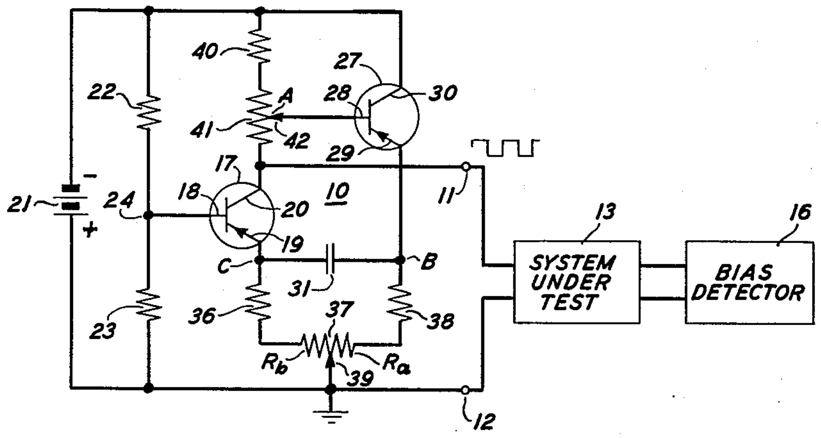

This invention relates to a transistor oscillator of the multivibrator type for generating an output wave of adjustable frequency and waveform.

In certain signal transmission systems, such as high speed data transmission systems employing telegraphic signals, information is transmitted in the form of combinations of successive mark and space signals. Each mark and each space may be individually termed a "bit" of information, and each mark-space signal is called a "dot." In testing such a system, it is advantageous to provide at the sending end a test signal comprising a train of dots and to measure at the receiving end any changes in certain dot characteristics that may have been injected thereinto during transmission.

The most practical source of test signal dots, of course, must provide dots with the desired characteristics and utilize a minimum amount of equipment. For example, the respective mark and space signals must have substantially vertical sides. The duration of the respective mark and space signals should be adjustable to be of equal duration for a symmetrical dot or to be of unequal duration for an unsymmetrical dot. In addition, the dot frequency should be readily adjustable within a limited range with a substantially smaller degree of change in the symmetry of the dot as a result of the change in frequency.

It is well known that an astable multivibrator circuit may be used to produce steep sided impulses and many circuit arrangements therefor have been devised. In the usual multivibrator circuit it is necessary to alter the time constants of two feedback circuits which cross couple the translating devices in order to change either the frequency or the symmetry of the output wave independently. Any change in the time constant of either of the two feedback circuits alone alters both the frequency and the symmetry of the output wave in the same degree. Therefore, when the frequency of the output wave in such a circuit is changed, the cross coupling circuits must both be carefully adjusted in order that the output wave symmetry should not be affected. In like manner, when the symmetry of the output wave in such a circuit is changed, the cross coupling circuits must both be carefully adjusted in order that the output wave frequency should not be affected.

In the vacuum tube art there are monostable, cathode-coupled multivibrators in which the frequency can be changed by changing the capacity of a commutating capacitor connected between the vacuum tube cathodes without changing output wave symmetry. However, it is at once recognized that in the latter circuit it is necessary to include in such a variable frequency circuit plural capacitors or a bulky single adjustable capacitor, and that such arrangements discourage miniaturization which is highly desirable in practical test equipment. In addition in the vacuum tube art, the same interdependence of frequency and symmetry is encountered in changing output wave symmetry as noted above.

The present invention contemplates a transistor type of multivibrator circuit in which the frequency of the oscillator output can be changed without substantially changing the symmetry thereof, and vice versa; and also in which the circuit structure lends itself expeditiously to miniaturization.

It is one object of the invention, therefore, to improve the utility of a multivibrator oscillator circuit.

It is another object to generate a symmetrical oscillator output wave with a readily adjustable frequency.

It is also another object to generate multivibrator oscillation waves of substantially constant frequency but variable symmetry.

It is a further object to adjust the frequency of a multivibrator circuit in a manner which tends inherently to preserve output wave symmetry.

Still another object is to adjust the frequency of a multivibrator output wave through a limited range by means of a single control.

It is also another object to provide a miniature type of multivibrator in which the frequency of the oscillation output and the symmetry thereof can be changed with substantially less dependence upon one another than has been heretofore realizable with prior art circuits.

It is also a further object to miniaturize a multivibrator circuit.

These and other objects of the invention are realized in an illustrative embodiment thereof in which a two-transistor, astable, multivibrator of the emitter coupled type is provided with frequency control means comprising a connection for applying a variable amount of potential difference appearing across the collector load resistance of one transistor to the base electrode of the other transistor. The network for coupling the emitter electrodes of the two transistors together includes a commutating capacitor connected between the emitter electrodes, and mutually inversely variable amounts of resistance connected between each emitter electrode and a grounded terminal of a source of operating potential. The base electrode of the one transistor is connected to an intermediate potential of the source via a potential divider which is connected between the source terminals. A resistance network including a potentiometer is connected between the collector electrode of the one transistor and an ungrounded terminal of the source. The second transistor collector electrode is connected directly to the ungrounded source terminal and its base electrode is connected to the same ungrounded source terminal via a variable portion of the potentiometer in the one transistor collector circuit.

Assume that upon the application of the operating potential to the transistors, one transistor begins to conduct more heavily than the other transistor. The potential differences developed in the collector and emitter circuits of the one transistor tend initially to bias the other transistor to its Off, or essentially zero conduction, condition. The commutating capacitor then charges with a first polarity, via one part of the mutually inversely variable resistances, toward the potential difference between the one transistor emitter electrode and ground until such time as it acquires sufficient charge to provide conducting bias to the other transistor emitter electrode and thus bias the other transistor into its On, or substantial conduction, condition. Conduction is then regeneratively transferred from the one transistor to the other transistor, and the one transistor is biased Off. When the commutating capacitor has acquired sufficient charge of the opposite polarity, via the remainder of the mutually inversely variable resistances, to bias the one transistor On again, conduction is regeneratively transferred thereto, and the other transistor is biased Off once more.

The multivibrator output wave frequency may be adjusted by varying the portion of the potentiometer which is connected between the other transistor base electrode and the ungrounded source terminal. This changes the bias potential on the other transistor base electrode and thus changes the voltage charge of the above-mentioned first polarity which must be accumulated on the commutating capacitor to bias the other transistor into conduction. However, the change in the amount of charge that is accumulated on the commutating capacitor also changes to a similar degree the time required for the commutating capacitor to acquire sufficient voltage charge of the above-mentioned opposite polarity to bias the one transistor into conduction. Thus, by changing the setting of the potentiometer only, the conduction times for both transistors may be altered in the same direction thereby inherently tending to preserve the initial conditions of symmetry.

The symmetry of the multivibrator output wave may be adjusted by varying the mutually inversely variable resistances between each emitter electrode and ground. This transfers resistance from one charging path to the other and changes in opposite directions the time constants of the two charging paths for the commutating capacitor; but, because the total resistance in the emitter coupling network remains the same, the total oscillator cycle time tends to remain constant.

Figure 2:
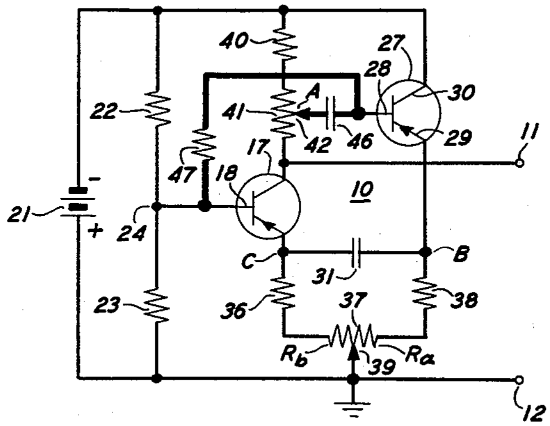
Figure 1A:
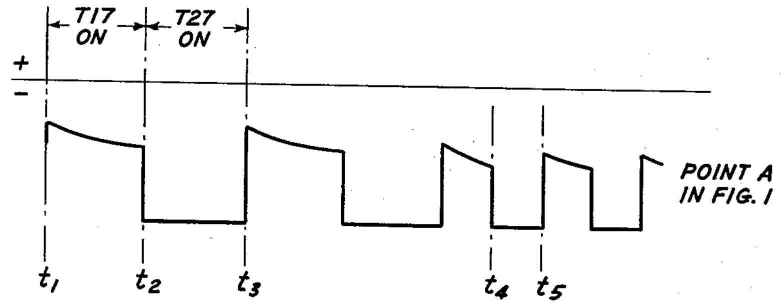
Figure 1B:
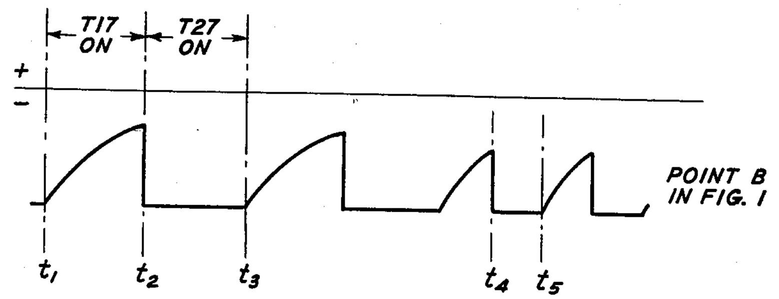
Figure 1C:
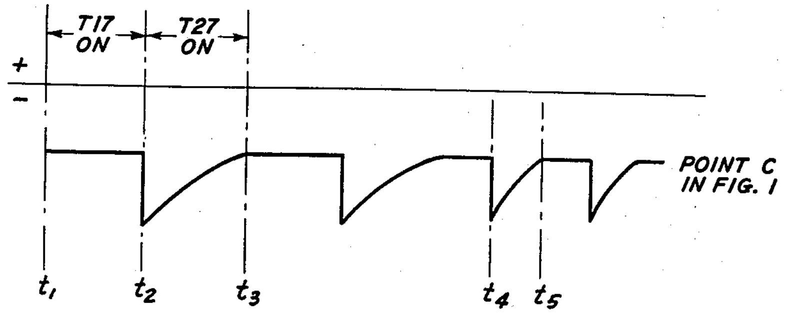

A better understanding of the invention may be gained by an examination of the following specification in connection with the drawing in which:

Fig. 1 is a partially schematic, and partially block and line, diagram of one embodiment of the invention;

Figs. 1A, 1B, and 1C comprise a family of voltage waveforms obtainable in Fig. 1; and Fig. 2 is a schematic diagram of a modification of Fig. 1.

Referring to Fig. 1, a multivibrator oscillator 10 is connected via output terminals 11 and 12 to the input of the transmission system 13, which is to be tested, for supplying dot signals thereto. The output of this system is applied to a bias detector circuit 16 for measuring time bias, or dissymmetry, in received dot signals. One such bias detector is described in U.S. Patent No. 2,918,623, which issued December 22, 1959, to W. R. Young, Jr.

One transistor 17 is provided with a base electrode 18, an emitter electrode 19, and a collector electrode 20. Transistor 17 is illustrated as a p-n-p junction type but may of course be any suitable type. Base electrode 18 is supplied with an intermediate potential of battery 21 via a potential divider which comprises a resistor 22 and a resistor 23 connected in series between the terminals of battery 21 and which includes junction point 24 connected to base electrode 18. The other transistor 27 of multivibrator 10 is a p-n-p type having a base electrode 28, an emitter electrode 29, and a collector electrode 30. Transistor 27 may also be any suitable type.

Transistors 17 and 27 are arranged in an emitter coupled type of astable multivibrator circuit. Emitter electrodes 19 and 29 are connected together by means of a resistance-capacitance network comprising a commutating capacitor 31, which is connected directly between emitter electrodes 19 and 29, and resistors 36, 37, and 38, which are connected in series in the order named between emitter electrodes 19 and 29. Resistor 37 is a potentiometer provided with an adjustable tap 39 which is connected to ground and to the positive terminal of battery 21.

Collector electrode 20 is connected to the negative terminal of battery 21 via the series combination of resistor 40 and potentiometer 41. Collector electrode 30 is connected directly to the negative terminal of battery 21. A variable portion of the potential drop between the negative terminal of battery 21 and collector electrode 20 is applied to base electrode 28 via an adjustable tap 42 on potentiometer 41.

Considering the operation of astable multivibrator 10, tap 42, emitter electrode 29, and emitter electrode 19 are also designated points A, B, and C, respectively; and waveforms of the voltages effective at these points with respect to ground are illustrated in Figs. 1A, 1B, and 1C, respectively. Let it be assumed first that transistor 17 is conducting at a time just after time $t_1$, and transistor 27 is Off. Commutating capacitor 31 charges toward the potential of emitter electrode 19 with respect to ground via a path which includes emitter electrode 19, collector electrode 20, potentiometer 41, resistor 40, battery 21, ground, tap 39, the right hand portion $R_a$ of potentiometer 37, and resistor 38. As capacitor 31 charges in this manner, with its right-hand terminal becoming positive with respect to its left-hand terminal, the total current flowing in potentiometer 41 decreases from the initial value when transistor 17 was biased On at time $t_1$. Tap 42, point A, becomes more negative as illustrated in Fig. 1A between the times $t_1$ and $t_2$. This reduction in the potential at tap 42 is exaggerated in Fig. 1A for the purpose of illustration, and actually the change is so small that the oscillator output wave at collector electrode 20 is substantially rectangular. Emitter electrode 29 becomes increasingly positive as shown in Fig. 1B between the times $t_1$ and $t_2$ until at time $t_2$ it becomes more positive than base electrode 28, and transistor 27 is biased On.

When transistor 27 begins to conduct, it diverts some of the current from transistor 17 thereby causing base electrode 28 and tap 42 to become more negative. Additional current is then diverted to transistor 27 causing tap 42, point A, to become still more negative. This process continues regeneratively and almost instantaneously until transistor 17 is cut off at time $t_2$, and base electrode 28 is then at a potential which is nearly equal to the potential of the negative terminal of battery 21. Emitter electrode 29 remains at substantially the same potential as base electrode 28 after transistor 27 starts to conduct so emitter electrode 29 is also driven rapidly to a negative potential which is nearly equal to the potential at the negative terminal of battery 21 as illustrated in Fig. 1B.

Emitter electrode 19 was at the same potential as base electrode 18 when transistor 17 was On. Since the voltage across capacitor 31 cannot change instantaneously, emitter electrode 19 is driven negatively at time $t_2$ by the same amount as emitter electrode 29 as shown in Fig. 1C.

With transistor 17 Off, commutating capacitor 31 now begins to charge toward the potential of emitter electrode 29 with respect to ground, via a charging current path which includes emitter electrode 29, collector electrode 30, battery 21, ground, tap 39, the left-hand portion $R_b$ of resistor 37, and resistor 36. The polarity of the potential difference across capacitor 31 reverses. The change in potential with respect to ground at point C between times $t_2$ and $t_3$ is illustrated in Fig. 1C. At time $t_3$ commutating capacitor 31 has acquired sufficient voltage charge to bias emitter electrode 19 to a potential which is slightly more positive than the fixed potential of base electrode 18 as established by resistors 22 and 23, and transistor 17 is biased On again and diverts some current from transistor $T_{27}$. The increased current in potentiometer 41 drives base electrode 28 positiveward thereby tending to divert additional current to transistor 17. In this manner conduction is regeneratively transferred from transistor 27 back to transistor 17 at time $t_3$. The transfer of conduction back and forth between transistors 17 and 27 continues without the aid of externally supplied triggering impulses in the manner described under the control of commutating capacitor 31.

The output wave of multivibrator 10 is derived between collector electrode 20 and ground and has substantially the same configuration as the wave at tap 42 or point A which is illustrated in Fig. 1A. This wave is applied via output terminals 11 and 12 as a dot signal to the transmission system 13 which is under test. The output wave is characterized by a series of spaced steep sided positive-going pulses which occur each time transistor 17 is conducting.

The symmetry of the output wave, that is the proportions of each out cycle which represent the conduction of transistors 17 and 27, respectively, is controlled by the setting of tap 39. When tap 39 is adjusted so that the resistance of the above-described charging path for capacitor 31 through transistor 17 is approximately equal to the resistance of the above-described charging path for capacitor 31 through transistor 27, the output wave of multivibrator 10 will be approximately symmetrical. The output wave can be given a predetermined unsymmetrical configuration in which either transistor 17 or transistor 27 conducts for a longer proportion of each output cycle than the other by adjusting tap 39 to a different position. Such adjustment changes the resistances of the two charging current paths for capacitor 31 in a mutually inverse manner, that is, a single adjustment of tap 39 transfers resistance from one path to the other path. The total resistance of both paths remains the same, and the total time consumed in charging capacitor 31 during a full cycle of operation remains essentially the same. Therefore, within a limited range of adjustment of tap 39 there is no significant change in multivibrator output frequency.

The frequency of the output wave of multivibrator 10 is primarily a function of the setting of tap 42. In order to change the frequency, it is necessary to change the time required for commutating capacitor 31 to charge sufficiently to trigger transistors 17 and 27 into conduction. This is accomplished by changing the potential level at which transistor 27 is triggered into conduction. An adjustment of tap 42 on potentiometer 41 changes the potential level at which transistor 27 may be biased On, and it also changes the amount by which the potential at emitter electrode 19 changes when transistor 27 is biased On. Consequently, the time required for the readjustment of the charge on capacitor 31 to bias transistor 17 On is also changed.

Taking a brief example, assume that tap 42 is adjusted upwardly on potentiometer 41 at some time before the time $t_4$ thereby reducing the potential difference between base electrode 28 and the negative terminal of battery 21 when transistor 17 is conducting. Since base electrode 28 is thus more negative, commutating capacitor 31 charges for a shorter time before biasing transistor 27 On at time $t_4$ as shown in Fig. 1B. Conduction time for transistor 17 during a cycle is thus reduced.

Since the potential difference between base electrode 28 and the negative terminal of battery 21 is now less than it was in the previously described case, the amount by which base electrode 28 and emitter electrodes 29 and 19 are driven negative when transistor 27 is biased On, as hereinbefore described, is also less than it was in the previously described case. This is evident from the wave diagrams of Figs. 1A, 1B, and 1C. Furthermore, since the potential change at emitter electrode 19 or point C is less when transistor 27 is biased On, less time is required for capacitor 31 to charge back to the fixed potential of base electrode 18 as illustrated between times $t_4$ and $t_5$ in Fig. 1C.

With less time being required for the adjustment of the charge on capacitor 31 to bias each transistor On when the other transistor is conducting, the total elapsed time for the completion of one cycle of oscillation is reduced and the output wave frequency is increased. If tap 42 is moved downwardly on potentiometer 41, the bias on base electrode 28 is increased and transistors 17 and 27 are both caused to conduct for longer periods of time in a manner similar to that described above thereby reducing the frequency of the output wave.

Thus it is seen that an adjustment of tap 42 causes the conduction times for transistors 17 and 27 to be changed in the same direction. Accordingly, the above-described multivibrator frequency changing arrangement tends inherently to preserve the symmetry of the output wave in response to changes in frequency.

In one case where potentiometer 41 had a total resistance of 10,000 ohms, the adjustment of tap 42 over the full range of potentiometer 41 caused a change in output frequency from 200 cycles per second to 2,000 per second with only a 25 percent change in the symmetry of the output wave. The change in symmetry may be expressed, for either a mark or a space information bit, in terms of the difference between actual bit duration and bit duration with no change in symmetry, all divided by the bit duration with no change in symmetry. In this particular example the frequency was changed by a factor of ten while the symmetry only changed by a factor of one and one quarter.

It has been found that, although the circuit of Fig. 1 is entirely suitable for most applications, the independence of frequency changes with respect to symmetry may be improved by the addition of two circuit elements as illustrated in Fig. 2. An alternating current by-pass capacitor 46 having a low impedance in the range of frequencies to be generated by multivibrator 10 is connected in series in the lead between base electrode 28 and tap 42. Capacitor 46 thus tends to couple to base electrode 28 the alternating potential component, and block the direct potential component, of the voltage wave at tap 42. In addition, a resistor 47 is connected between base electrodes 18 and 28. The series combination of capacitor 46 and resistor 47 has a time constant which is very large with respect to the multivibrator oscillation period, and resistor 47 is large with respect to the resistance of the parallel combination of resistors 22 and 23, so that base electrode 28 tends to be held at the same average direct current potential as base electrode 18. The large time constant of capacitor 46 and resistor 47 causes the alternating current wave at point A to be coupled to base electrode 28 with substantially no distortion thereby preventing capacitor 46 and resistor 47 from exercising any direct control over the period of the multivibrator oscillation. The potential of base electrode 18 is not substantially affected by alternating potential occurrences at tap 42 because the resistance of the bleeder consisting of resistors 22 and 23 is small with respect to the resistance of resistor 47 as noted above.

While this invention has been described in connection with particular embodiments thereof, additional modifications will be apparent to those skilled in the art and are included within the spirit and scope of the following claims.

What is claimed is:

1. An astable multivibrator circuit comprising first and second transistors each having base, emitter, and collector electrodes, a resistance-capacitance time constant network for connecting both of said emitter electrodes to a reference potential point, a source of direct-current potential having two terminals, one of said terminals being connected to said reference potential point, an impedance connected between said source terminals, a connection from said base electrode of said first transistor to an intermediate point on said impedance, frequency control means comprising a potential divider having two fixed terminals and an adjustable terminal, means for connecting said two fixed terminals to said first transistor collector electrode and a second terminal of said source, respectively, and means for connecting said second transistor base electrode to said adjustable terminal, means for connecting said second transistor collector electrode to said second source terminal, and an output circuit connected between said first transistor collector electrode and said reference potential point.

2. The multivibrator circuit according to claim 1 in which said resistance-capacitance network includes a potentiometer having a movable tap connected to said reference potential point for controlling the symmetry of the output oscillations effective at said output circuit.

3. An astable multivibrator circuit comprising first and second transistors each having base, emitter, and collector electrodes, a source of potential, means for normally biasing a first one of said transistors in a conducting, or On, condition comprising means for applying a portion of said source potential to said first transistor base electrode, resistance means for connecting said first transistor collector electrode to one terminal of said source, and a resistance-capacitance circuit connected between a second terminal of said source and said first transistor emitter electrode, means for adjustably biasing said second transistor below cut-off, or Off, by a predetermined potential comprising a connection between said second transistor base electrode and a variable intermediate point on said resistance means, and means for biasing said first transistor below cut-off by said predetermined potential comprising a connection between said second transistor collector electrode and said one terminal, and means for connecting the capacitance of said resistance-capacitance circuit between said emitter electrodes to bias said second transistor On in response to conduction of said first transistor for a first predetermined time, said adjustably biasing means and said resistance-capacitance circuit also biasing said second transistor Off by said predetermined potential in response to conduction in said first transistor for a second predetermined time.

4. The astable multivibrator circuit in accordance with claim 3 in which said resistance-capacitance circuit further comprises first and second variable resistances connected between said second terminal and said emitter electrodes, respectively, a first charging current path for charging the capacitance of said resistance-capacitance circuit with a first polarity in response to conduction in said first transistor comprising said first transistor, said resistance means, said source, and said first variable resistance, and a second charging current path for charging said capcitance with a second polarity in response to conduction in said second transistor comprising said second transistor, said source, and said second variable resistance both of said predetermined times, with any combination of time constants of said charging current paths, being functions of said predetermined potential.

5. The astable multivibrator circuit in accordance with claim 3 in which said first and second variable resistances comprise a fixed resistance connected between said emitter electrodes, and an adjustable tap on said fixed resistance connected to said second terminal for mutually inversely varying the amount of resistance between each of said emitter electrodes and said second source terminal.

6. A test signal generator comprising first and second transistors each having base, emitter, and collector electrodes, a source of potential having two terminals, first resistance means for connecting a portion of the potential of said source to said first transistor base electrode, an output circuit connected between said first transistor collector electrode and a first terminal of said source, means for connecting said emitter electrodes to said first terminal comprising a capacitor connected between said emitter electrodes for alternately biasing each of said transistors into conduction in opposite phase in response to conduction in the other transistor for a predetermined time to produce test signal oscillations in said output circuit, and a resistance potential divider having the fixed resistance portion thereof connected between said emitter electrodes and having an adjustable tap thereon connected to said first terminal of said source, a connection from said second transistor collector electrode to a second terminal of said source, second resistance means connected between said first transistor collector electrode and said second source terminal, and means for adjusting the conduction time of both of said transistors simultaneously and in the same sense to adjust in the opposite sense the frequency of oscillations coupled to said output circuit, said adjusting means comprising means for connecting an adjustable portion of said second resistance means between said second transistor base electrode and said second source terminal.

7. The test signal generator in accordance with claim 6 in which a resistor is connected between said base electrodes for holding said base electrodes at approximately the same average direct current potential, the resistance of said resistor being substantially larger than the resistance of said first resistance means, and said means for connecting said adjustable portion of said second resistance means to said second transistor base electrode comprises a capacitor connected in series between said second transistor base electrode and said adjustable portion of said second resistance means for coupling only the alternating current component of the potential in said adjustable portion to said second transistor base electrode, the time constant of said resistor and the last mentioned capacitor being large with respect to the period of said oscillations.

8. An oscillator circuit for generating a substantially rectangular output wave of adjustable frequency comprising first and second transistors each having base, emitter, and collector electrodes, each of said transistors also having a conducting and a nonconducting condition, a source of potential, means for applying a predetermined portion of the potential of said source to said first transistor base electrode, a commutating capacitor connected between said emitter electrodes, a first resistance means connected between said emitter electrodes in parallel with said capacitor, means to connect one terminal of said source to said first resistance means for connecting mutually inversely variable portions of said first resistance means between said one terminal and said emitter electrodes, an output circuit connected between said first transistor collector electrode and said one terminal of said source, a second resistance means connected between said first transistor collector electrode and a second terminal of said source, a connection between said second transistor collector electrode and the last-mentioned second terminal, a first charging current path for said commutating capacitor comprising a first portion of said first resistance means, said capacitor, the internal emitter-collector impedance of said first transistor, said second resistance means and said source, a second charging current path for said capacitor comprising a second portion of said first resistance means, said capacitor, the internal emitter-collector circuit of said second transistor, said connection, and said source of potential, means for connecting a variable portion of said second resistance means between said second transistor base electrode and said second terminal, said capacitor charging cyclically first via said first charging current path to a potential corresponding to the potential difference across said variable portion to bias said second transistor to its conducting condition and to bias said first transistor to its nonconducting condition, said capacitor then charging via said second charging current path to a potential corresponding to said portion of said source potential for biasing said first transistor into conduction and biasing said second transistor into its nonconducting condition.

9. An astable oscillatory circuit comprising a first transistor having base, emitter, and collector electrodes, a source of potential having first and second terminals, an impedance connected between said terminals, means for connecting said base electrode to an intermediate point on said impedance to establish the operating potential level of said base electrode, means for applying the output potential from said source to said collector and emitter electrodes comprising a resistor connected between said collector electrode and said first terminal, and a resistance-capacitance network connected between said emitter electrode and said second terminal a second transistor having base, emitter, and collector electrodes, a connection from said second transistor collector electrode to said first terminal, and means for regeneratively transferring conduction between said transistors at an adjustable frequency with substantially equal conduction times for each transistor, the last-mentioned means comprising means for connecting the capacitance of said resistance-capacitance network between the emitter electrodes of said transistors, and means for adjustably connecting the base electrode of said second transistor to an intermediate point on said resistor for adjusting the frequency of oscillation, said capacitor charging with a first polarity in response to conduction in said first transistor to initiate the regenerative transfer of conduction from said first transistor to said second transistor upon the attainment of a charge equivalent to the base potential of said second transistor, said capacitor charging with a second polarity in response to conduction in said second transistor to initiate the regenerative transfer of conduction from said second transistor to said first transistor upon the attainment of a charge equivalent to said operating potential level.

10. An astable multivibrator circuit comprising first and second transistors each having base, emitter, and collector electrodes, a capacitor connected between a first pair of like electrodes of said transistors, a resistance potential divider having the fixed resistance portion thereof connected between said like electrodes and having an adjustable tap, a source of direct-current potential, means for connecting said source between said tap and a second pair of like electrodes of said transistors, means for connecting said base electrode of said first transistor to an intermediate point on said source, and means for coupling a variable amount of the potential of said potential source to said second transistor base electrode.

References Cited in the file of this patent

UNITED STATES PATENTS

| | | |
|---|---|---|
| 2,787,712 | Priebe et al. | Apr. 7, 1957 |
| 2,812,437 | Spiklai | Nov. 5, 1957 |

OTHER REFERENCES

Rockett: "Impedance Meas., With Square Waves," Electronics, September 1944, pp. 138–140."